(12) United States Patent
Kang et al.

(10) Patent No.: US 7,813,904 B2
(45) Date of Patent: Oct. 12, 2010

(54) METHOD, APPARATUS, AND COMPUTER READABLE MEDIUM BASED PROGRAM FOR SIMULATING AN ALTERNATE CURRENT ELECTRIC MOTOR USING A MOTOR MODEL

(75) Inventors: Zibo Kang, Toyota (JP); Yukihiro Hayashi, Toyota (JP); Masaaki Tokai, Toyota (JP); Hirona Morita, Toyota (JP)

(73) Assignee: Toyota Technical Development Corporation, Toyota-shi (JP)

( * ) Notice: Subject to any disclaimer, the term of this patent is extended or adjusted under 35 U.S.C. 154(b) by 687 days.

(21) Appl. No.: 11/719,605

(22) PCT Filed: Nov. 17, 2005

(86) PCT No.: PCT/JP2005/021503
§ 371 (c)(1),
(2), (4) Date: May 17, 2007

(87) PCT Pub. No.: WO2006/054784
PCT Pub. Date: May 26, 2006

(65) Prior Publication Data
US 2009/0157370 A1     Jun. 18, 2009

(30) Foreign Application Priority Data
Nov. 17, 2004 (JP) .............................. 2004-333578
Nov. 17, 2004 (JP) .............................. 2004-333584

(51) Int. Cl.
*G06F 7/60* (2006.01)
*G06F 17/10* (2006.01)
*G06F 19/00* (2006.01)
(52) U.S. Cl. .......................................... 703/2; 700/170
(58) Field of Classification Search ..................... 703/2; 318/432; 700/170; 388/809
See application file for complete search history.

(56) References Cited
U.S. PATENT DOCUMENTS
3,370,191 A  *  2/1968  Koch .......................... 310/168

(Continued)

FOREIGN PATENT DOCUMENTS
JP          2004 222437         8/2004

(Continued)

OTHER PUBLICATIONS

A.A. Arkadan, F.N. Isaac, A.A. Russell, A. El-Antably, N.A. Demerdash, "Computer Aided Models for the Characterization of Synchronous Reluctance Motor Drive Systems" IEEE Transactions on Energy Conversion, vol. 14, No. 4 Dec. 1999, pp. 1459-1464.*

(Continued)

*Primary Examiner*—Dwin M Craig
(74) *Attorney, Agent, or Firm*—Oblon, Spivak, McClelland, Maier & Neustadt, L.L.P.

(57) ABSTRACT

This is to provide a computing method of motor model, a motor simulation method and a motor simulation apparatus in which high-speed real-time simulation is made feasible while saving computer resources. A motor model is formulated, motor model which uses a motor model of alternate-current motor which virtually includes the inverse matrix of an inductance matrix $L(\theta)$, which is a predetermined function whose variable is a rotary angle $\theta$, and, in the computation of this motor model, the value, which is obtained by computing a matrix $\lambda(\theta)$ which is equal to the inverse matrix of the inductance matrix $L(\theta)$, is used as the value of the inverse matrix of the inductance matrix $L(\theta)$.

7 Claims, 5 Drawing Sheets

U.S. PATENT DOCUMENTS

| | | | |
|---|---|---|---|
| 4,763,058 A * | 8/1988 | Heining et al. | 318/807 |
| 5,692,158 A * | 11/1997 | Degeneff et al. | 703/2 |
| 5,936,370 A * | 8/1999 | Fukao et al. | 318/652 |
| 6,005,364 A * | 12/1999 | Acarnley | 318/632 |
| 6,426,602 B1 * | 7/2002 | McCann et al. | 318/432 |
| 2002/0163320 A1 | 11/2002 | Buck | |
| 2003/0163296 A1 * | 8/2003 | Richards | 703/14 |
| 2003/0169004 A1 | 9/2003 | Kaku et al. | |
| 2003/0218444 A1 * | 11/2003 | Marcinkiewicz et al. | 318/727 |
| 2004/0090198 A1 | 5/2004 | Kaku et al. | |

FOREIGN PATENT DOCUMENTS

| | | |
|---|---|---|
| JP | 2004 236392 | 8/2004 |
| JP | 2004 312864 | 11/2004 |

OTHER PUBLICATIONS

M. A. Preston, J.P. Lyons, "A Switched Reluctance Motor Model with Mutual Coupling and Multi-Phase Excitation" IEEE Transactions on Magnetics, vol. 27, No. 6, Nov. 1991, pp. 5423-5425.*

Guy Sturtzer, Damien Flieller, Jean Paul Louis, "Mathematical and Experimental Method to Obtain the Inverse Modeling of Nonsinusoidal and Saturated Synchronous Reluctance Motors" IEEE Transactions on Energy Conversion, vol. 18, No. 4, Dec. 2003, pp. 494-500.*

\* cited by examiner

Time ⟶
(Simulation Direction)

METHOD, APPARATUS, AND COMPUTER READABLE MEDIUM BASED PROGRAM FOR SIMULATING AN ALTERNATE CURRENT ELECTRIC MOTOR USING A MOTOR MODEL

TECHNICAL FIELD

The present invention relates to an improvement on a computing method of motor model, a motor simulation method, a motor simulation apparatus and a motor-model computing program, which are effective for the simulation of control system using alternate-current motor, for instance. Moreover, the present invention relates to an improvement on a simulation method and a simulation program, which simulate the temporally-fluctuating state of object using computer.

BACKGROUND ART

In various operations such as the development, debugging, adaptation and verification of control algorithms for motor devices, which use alternate-current motors, it has been carried out to simulate the behavior of motors or inverters in real time using motor models as imaginary motors thereof or inverter models as imaginary inverters thereof for driving them. The motor models or inverter models used for this real-time simulation are defined by equations as set forth in Japanese Patent Application Publication No. JP-A-2004-236392. As for the equations, in order to define the relationship between voltage and current, for instance, the following are available: a way which defines it using a stationary coordinate system; and a way which defines it using a rotary coordinate system (the so-called dq axis).

Moreover, recently, a simulation technology has been advancing, simulation technology which formulates a temporally-changing event as a mathematical-formula model on calculating equipment and imitates an aiming change of the event in real time by means of calculating this mathematical-formula model for every short period of time. Such a simulation technology can be used widely for from natural events like weather to electric devices like motor devices. In simulation technologies, calculating equipment often deals with matrices. For example, as for a model including an equation which includes such a matrix, motor models: that is, models for alternate-current motors and the motor portion of motor devices which are devices including alternate-current motors; have been known.

To simulate a control algorithm of motor device, which uses an alternate-current motor, in real time using such a motor model is set forth in the aforementioned literature, for instance.

DISCLOSURE OF THE INVENTION

However, when carrying out a simulation of alternate-current motor or inverter by an equation which uses a stationary coordinate system, it is difficult to carry out a highly-accurate real-time simulation a short step periods, because the computation gets very complicated and troublesome.

Accordingly, conventionally, although it has been done usually to carry out a simulation of alternate-current motor or inverter by an equation which uses a rotary coordinate system in which the computing process is easier relatively compared with the computation of stationary coordinate system, there is such a problem that the computational accuracy degrades because a coordinate-axis conversion process becomes necessary when using a rotary coordinate system. Moreover, even in the computing process of an equation which uses a rotary coordinate system, it has not been easy to execute a motor simulation with limited calculation resources because of the necessity of coordinate-axis conversion process.

The present invention is one which has been done in view of the aforementioned problematic points, and its first object is to provide a computing method of motor model, a motor simulation method, a motor simulation apparatus and a motor-model computing program in which high-speed and high-accuracy real-time simulation is made possible while saving computer resources.

Moreover, in order to reduce error in the aforementioned conventional real-time simulations, although the improvement of computational accuracy and the shortening of computation intervals become necessary, it has not been done readily to execute high-accuracy real-time simulations economically because it is necessary to employ highly expensive calculation resources on a large scale to do so. In particular, the inverse matrix of a matrix is such that the subtracting process whose processing time is longer compared with the other calculating processes is needed and the calculation is likely to get complicated, and it aggravates the aforementioned problems.

The present invention is one which has been done in view of the aforementioned problematic points, and its object is to provide a simulation method and a simulation program which can process high-accuracy real-time simulations of event models economically.

Note that the present invention is expressed in the form of computational processing technology for calculation resources, that is, computer program, substantially, and the methods of the present invention are realized only by loading this program onto usual calculation resources. Therefore, since the program for executing the methods of the present invention includes in such a state that the methods of the present invention themselves are executable extremely readily, it should be noted that the distribution of such a program is included in the methods of the present invention as one which falls under the enforcement of the methods of the present invention or the act of encouraging it.

A computing method of motor model according to a first invention is a computing method of motor model using a motor model using a motor model which is defined by an equation on a stationary coordinate system, the stationary coordinate system specifying a state of an alternate-current motor which comprises a rotor for generating a magnetic-field flux $\phi r$ and a stator with multiple-phase armature coils wound therearound, said equation including at least a multiple-phase armature current i and a multiple-phase armature voltage U as variables thereof, and the computing method comprises the steps of:

formulating a motor model in which the inverse matrix of an inductance matrix $L(\theta)$, which is a predetermined function whose variable is a rotary angle $\theta$, is converted into a matrix $\lambda(\theta)$ which is a function whose variable is the rotary angle $\theta$; and computing the matrix $\lambda(\theta)$ to compute the value of the inverse matrix of the inductance matrix $L(\theta)$, and feeding the value of the inverse matrix into the equation, which makes said motor model, thereby obtaining desirable variable values.

Specifically, the computing method of motor model according to this invention can simply express the motor model because it defines the parts of the equation making the motor model, parts which are relevant to the armature inductances, using the inverse matrix of the inductance matrix $L(\theta)$; and additionally it can simplify the computing process remarkably because it computes them after it has converted this inverse matrix into a format of the matrix $\lambda(\theta)$; and, as a result thereof, it can compute the motor model highly accurately even in a limited operation time like high-speed and real-time simulation.

In a preferable mode, said inductance matrix $L(\theta)$ is a matrix of inductances of multiple-phase armature coils, the inductances specifying a relationship between a current magnetic flux $\phi s$, which is an armature-coil flux linkage resulting from the multiple-phase armature current i, and the multiple-phase armature current i. When making it in this way, a high-speed computation of the inverse matrix of the inductance matrix $L(\theta)$ becomes feasible, because it is possible to formulate the inductance matrix $L(\theta)$ and the inverse matrix thereof as well as the matrix $\lambda(\theta)$, which is equal to this inverse matrix, simply.

In a preferable mode, a high-speed and high-accuracy motor-model computation becomes feasible, because, when a multiple-phase armature resistance is labeled Rs, the multiple-phase armature current is labeled i and the multiple-phase armature voltage is labeled U, an equation, which is specified by a Mathematical Formula 13, is used as said motor model, which is defined using the inductance matrix $L(\theta)$ and the inverse matrix thereof.

$$\frac{di}{dt} = L(\theta)^{-1}\left[-RsEi - \frac{dL(\theta)}{dt}i + U - \frac{d\psi r}{dt}\right] \quad \text{[Mathematical Formula 13]}$$

In a preferable mode, it is possible to define the motor model without using the inductance matrix $L(\theta)$, because the equation (that is, the motor model) includes: a first equation, which specifies at least a quantitative relationship between the current magnetic flux $\phi s$, an armature resistance Rs, the inverse matrix of the inductance matrix $L(\theta)$ the multiple-phase armature voltage U and the magnetic-field flux $\phi r$; and a second equation, which specifies at least a quantitative relationship between the multiple-phase armature current i, the current magnetic flux $\phi s$ and the inverse matrix of the inductance matrix $L(\theta)$. As a result thereof, a further high-speed and high-accuracy computation becomes feasible, because it is possible to abbreviate the computation which is relevant to the inductance matrix $L(\theta)$.

In a preferable mode, since said equations, which are specified by a following Mathematical Formula 15 and a Mathematical Formula 16, are used as said motor model, it is not necessary to compute the inductance matrix $L(\theta)$ or a function whose variable is the matrix and accordingly a high-speed and high-accuracy computation of the motor model becomes feasible.

$$\frac{d\psi s}{dt} = -RsL(\theta)^{-1}\psi s + U - \frac{d\psi r}{dt} \quad \text{[Mathematical Formula 15]}$$

$$i = L(\theta)^{-1}\psi s \quad \text{[Mathematical Formula 16]}$$

In a preferable mode, said matrix $\lambda(\theta)$ is computed based on a d-axis inductance Ld of said alternate-current motor, a q-axis inductance Lq of the alternate-current motor and a leakage inductance Ll thereof. Specifically, in this mode, since the respective elements of the matrix $\lambda(\theta)$ are defined by a d-axis inductance Ld of said alternate-current motor, a q-axis inductance Lq of the alternate-current motor and a leakage inductance Ll thereof, the computing process of the respective elements of the matrix $\lambda(\theta)$, which is equal to the inverse matrix of the inductance matrix $L(\theta)$, becomes easy. Accordingly, it is possible to carry out the computation of the matrix $\lambda(\theta)$ at high speed and with high accuracy.

In a preferable mode, inductance reciprocal functions $\lambda as$ and $\lambda a$ are computed by feeding the reciprocal $\lambda d$ of the d-axis inductance Ld, the reciprocal $\lambda q$ of the q-axis inductance Lq and the reciprocal $\lambda l$ of the leakage inductance Ll into a Mathematical Formula 37 and a Mathematical Formula 38; and $$\lambda as = \frac{1}{3}(\lambda q - \lambda d) \quad \text{[Mathematical Formula 37]}$$

$$\lambda a = \frac{1}{3}(\lambda q + \lambda d) - \frac{2}{3}\lambda\ell \quad \text{[Mathematical Formula 38]}$$

$\lambda 11, \lambda 12, \lambda 13, \lambda 21, \lambda 22, \lambda 23, \lambda 1, \lambda 2$ and $\lambda 3$, the respective elements of the matrix $\lambda(\theta)$, are computed by feeding the computed inductance reciprocal functions $\lambda as$ and $\lambda a$ and the reciprocal $\lambda l$ of the leakage inductance Ll into a Mathematical Formula 39 through a Mathematical Formula 44.

$\lambda_{11}=\lambda l+\lambda a-\lambda as \cos 2$ [Mathematical Formula 39]

$\lambda_{12}=-\tfrac{1}{2}\lambda a-\lambda as \cos(2\theta-\tfrac{2}{3}\pi)$ [Mathematical Formula 40]

$\lambda_{13}=-\tfrac{1}{2}\lambda a-\lambda as \cos(2\theta+\tfrac{2}{3}\pi)$ [Mathematical Formula 41]

$\lambda_{22}=\lambda l+\lambda a-\lambda as \cos(2\theta+\tfrac{2}{3}\pi)$ [Mathematical Formula 42]

$\lambda_{23}=-\tfrac{1}{2}\lambda a-\lambda as \cos 2\theta$ [Mathematical Formula 43]

$\lambda_{33}=\lambda l+\lambda a-\lambda as \cos(2\theta-\tfrac{2}{3}\pi)$ [Mathematical Formula 44]

$\lambda_{21}=\lambda_{12}$ [Mathematical Formula 45]

$\lambda_{31}=\lambda_{13}$ [Mathematical Formula 46]

$\lambda_{32}=\lambda_{23}$ [Mathematical Formula 47]

By doing thusly, it is possible to compute the respective elements of the matrix $\lambda(\theta)$ at much higher speed and with high accuracy, because it is possible to define the respective elements of the matrix $\lambda(\theta)$ much easier.

A computing method of motor model according to a second invention using a motor model which is defined by an equation on a stationary coordinate system, the stationary coordinate system specifying a state of an alternate-current motor which comprises a rotor for generating a magnetic-field flux $\phi r$ and a stator with multiple-phase armature coils wound therearound, said equation including at least a multiple-phase armature current i and a multiple-phase armature voltage U as variables thereof, and the computing method of motor model being a computing method of motor model computing another values of said variables by feeding numerical values into said predetermined variables, the computing method comprises the step of forming the motor model using: a first equation, which specifies a quantitative relationship between a current magnetic flux $\phi s$, which is an armature-coil flux linkage resulting from the multiple-phase armature current i, a predetermined function whose variable is a rotary angle $\theta$ and the multiple-phase armature voltage U; and a second equation, which specifies a quantitative relationship between the current magnetic flux $\phi s$, said predetermined function and the multiple-phase armature current i.

Specifically, in accordance with this invention, the motor model is formulated using the first equation, which specifies the quantitative relationship between the current magnetic flux $\phi s$ and the multiple-phase armature voltage U, and the second equation, which specifies the quantitative relationship between the current magnetic flux φs and the multiple-phase armature current i. By doing thusly, since both of these equations can be defined without using the inductance matrix L(θ), it is possible to abbreviate the computation of the inductance matrix L(θ) or a function thereof; as a result thereof, it is possible to compute the motor model at high speed and with high accuracy.

In a preferable mode, since the current magnetic flux φs is computed by means of feeding said predetermined function and a value of the multiple-phase armature voltage U into said first equation; and the multiple-phase armature current i is computed by means of feeding the current magnetic flux φs and a value of said predetermined function into said second equation, it is possible to compute the multiple-phase armature current i at high speed and with high accuracy.

In a preferable mode, since said predetermined function is defined as the inverse matrix of the inductance matrix L(θ), which is a predetermined matrix whose variable is the rotary angle θ, the computation of the motor model becomes feasible by means of computing the matrix λ(θ), which is equal to the inverse matrix of the inductance matrix L(θ), and a high-speed and high-accuracy computation thereof becomes feasible.

In a preferable mode, since said inductance matrix L(θ) is a matrix of inductances of the multiple-phase armature coils, the inductances specifying a relationship between the current magnetic flux φs, which is an armature-coil flux linkage resulting from the multiple-phase armature current i, and the multiple-phase current i; the inverse matrix of the inductance matrix L(θ) is defined to be equal to a matrix λ(θ); and the respective elements of said matrix λ(θ) are functional values of a d-axis inductance Ld of said alternate-current motor, a q-axis inductance Lq of the alternate-current motor and a leakage inductance Ll thereof, the respective elements of the matrix λ(θ) can be defined by simple functions; as a result thereof, a high-speed and high-accuracy computation of the motor model becomes feasible by means of computing the inverse matrix of the inductance matrix L(θ) at high speed and with high accuracy.

Note that the computing methods of motor model set forth in the aforementioned paragraphs can possess a form of program, which is executed by computers. The computing methods of motor model, which this program defines, possess the characteristic that a high-speed and high-accuracy computation is feasible as explained already.

A third invention is a motor simulation method, which comprises the step of: periodically executing a computing step of computing a state of said motor model using the aforementioned computing method of motor model, thereby simulating a state of an imaginary motor, which is defined by said motor model, in real time. In accordance with this motor simulation method, since the computation of the motor model's state can be executed at high speed and with high accuracy as explained above, a high-speed and high-accuracy motor simulation becomes feasible.

In a preferable mode, a characteristic value of the imaginary motor, which comprises a constant of said equation and additionally which is prescribed by said motor model, is altered in compliance with at least one of external commands, a state of said motor model which is a computed variable value of said motor model, and a predetermined motor state which is computed with another program. In particular, this alteration is carried out during the computation of the motor model according to the present invention. The predetermined motor state, which is computed with another program is adapted to be an armature temperature, which changes during the imaginary motor's running, that is, during the computation of the motor model, for instance; and the characteristic value of the aforementioned imaginary motor is adapted to be an armature resistance. By doing thusly, since it is possible to give the armature resistance change, which results from the armature temperature change during the imaginary motor's running, to the motor model, which are being computed, a more accurate computation of the motor model becomes feasible. Moreover, by means of finding the armature resistance change, and the like, which results from the aforementioned armature temperature, with an external device and feeding it into the motor model, for instance, it is possible to reflect the armature resistance change, which results from the armature temperature change during the imaginary motor's running, in the motor model, which are being computed.

A fourth invention is a motor simulation apparatus, which comprises: a computing device using the aforementioned computing method of motor model to simulate a state of an imaginary motor, which is defined by said motor model, in real time by means of periodically executing a computing step of computing a state of said motor model. In accordance with this motor simulating apparatus, since the computation of the motor model's state can be executed at high speed and with high accuracy as explained above, a high-speed and high-accuracy motor simulation becomes feasible.

In preferable mode 1, it further comprises: a stationary-coordinate-system computing unit using a stationary-coordinate-system motor model, which is defined by an equation on a stationary coordinate system, the stationary coordinate system specifying at least a state of an alternate-current motor which comprises a rotor for generating a magnetic-field flux φr and a stator with multiple-phase armature coils wound therearound, said equation including a multiple-phase armature current i and a multiple-phase armature voltage U as variables thereof, and the stationary-coordinate-system computing unit computing another values of said variables by feeding numerical values into said predetermined variables of the stationary-coordinate-system motor model; and a dq rotary-coordinate-system computing unit carrying out a coordinate-system conversion computation for converting said state of the alternate-current motor, which comprises values of said variables on the stationary coordinate system, the values being computed by said stationary-coordinate-system computing unit, into a value on a dq rotary coordinate system; wherein: said stationary-coordinate-system computing unit periodically executes a computing step, which is for computing a state of said stationary-coordinate-system motor model based on a motor control command from the outside, thereby simulating a state of an imaginary motor, which is equivalent to said stationary-coordinate-system motor model; and said dq rotary-coordinate-system computing unit converts a current state of said alternate-current motor into a value on the dq rotary coordinate system according to a rotary-coordinate-system display command being input from the outside, thereby outputting it as data to be displayed to the outside. By doing thusly, while confirming the motor's state on the dq rotary coordinate system on the outside, a motor simulation can be executed by the stationary-coordinate-system motor model at high speed and with high accuracy.

A motor-model computing program according to a fifth invention is a motor-model computing program for computing a motor model, the motor model being defined by an equation on a stationary coordinate system, the stationary coordinate system specifying a state of an alternate-current motor which comprises a rotor for generating a magnetic-field flux φr and a stator with multiple-phase armature coils wound therearound, said equation including at least a multiple-phase armature current i and a multiple-phase armature voltage U as variables thereof, the motor-model computing program comprises the steps of: computing a matrix $\lambda(\theta)$, being constituted of a function whose variable is a rotary angle $\theta$ and additionally being a function which is equal to the inverse matrix of an inductance matrix $L(\theta)$ which specifies a relationship between a current magnetic flux $\phi s$, which is an armature-coil flux linkage resulting from the multiple-phase armature current i, and the multiple-phase armature current i; and obtaining values of desirable variables of said equation by feeding the value of said matrix $\lambda(\theta)$ into the equation as the value of the inverse matrix of the inductance matrix $L(\theta)$, which is included in said equation. By means of using this program, it is possible to compute a motor model at remarkably higher speed than it has been done conventionally as already described.

In a preferable mode, the step of computing said matrix $\lambda(\theta)$ comprises the steps of: computing inductance reciprocal functions $\lambda as$ and $\lambda a$ by feeding the reciprocal $\lambda d$ of the d-axis inductance Ld of said alternate-current motor, the reciprocal $\lambda q$ of the q-axis inductance Lq thereof and the reciprocal $\lambda l$ of the leakage inductance Ll thereof into a Mathematical Formula 37 and a Mathematical Formula 38; and $$\lambda as = \frac{1}{3}(\lambda q - \lambda d) \qquad \text{[Mathematical Formula 37]}$$

$$\lambda a = \frac{1}{3}(\lambda q + \lambda d) - \frac{2}{3}\lambda \ell \qquad \text{[Mathematical Formula 38]}$$

computing $\lambda 11$, $\lambda 12$, $\lambda 13$, $\lambda 21$, $\lambda 22$, $\lambda 23$, $\lambda 31$, $\lambda 32$ and $\lambda 33$, the respective elements of the matrix $\lambda(\theta)$, by feeding the computed inductance reciprocal functions $\lambda as$ and $\lambda a$ and the reciprocal $\lambda 1$ of the leakage inductance Ll into a Mathematical Formula 39 through a Mathematical Formula 44.

$\lambda_{11} = \lambda l + \lambda a - \lambda as \cos 2\theta$ [Mathematical Formula 39]

$\lambda_{12} = -\frac{1}{2}\lambda a - \lambda as \cos(2\theta - \frac{2}{3}\pi)$ [Mathematical Formula 40]

$\lambda_{13} = -\frac{1}{2}\lambda a - \lambda as \cos(2\theta + \frac{2}{3}\pi)$ [Mathematical Formula 41]

$\lambda_{22} = \lambda l + \lambda a - \lambda as \cos(2\theta + \frac{2}{3}\pi)$ [Mathematical Formula 42]

$\lambda_{23} = -\frac{1}{2}\lambda a - \lambda as \cos 2\theta$ [Mathematical Formula 43]

$\lambda_{33} = \lambda l + \lambda a - \lambda as \cos(2\theta - \frac{2}{3}\pi)$ [Mathematical Formula 44]

$\lambda_{21} = \lambda_{12}$ [Mathematical Formula 45]

$\lambda_{31} = \lambda_{13}$ [Mathematical Formula 46]

$\lambda_{32} = \lambda_{23}$ [Mathematical Formula 47]

By means of using this program, it is possible to compute a motor model at remarkably higher speed than it has been done conventionally as already described.

A motor-model computing program according to a sixth invention is a motor-model computing program for computing a motor model, the motor model being defined by an equation on a stationary coordinate system, the stationary coordinate system specifying a state of an alternate-current motor which comprises a rotor for generating a magnetic-field flux $\phi r$ and a stator with multiple-phase armature coils wound therearound, said equation including at least a multiple-phase armature current i and a multiple-phase armature voltage U as variables thereof, the motor-model computing program comprises the steps of: computing a current magnetic flux $\phi s$, which is an armature-coil flux linkage resulting from the multiple-phase armature current i, by means of feeding a predetermined function, whose variable is a rotary angle $\theta$, and a value of the multiple-phase armature voltage U into a first equation, which specifies a quantitative relationship between the current magnetic flux $\phi s$, said predetermined function and the multiple-phase armature voltage U; and computing the multiple-phase armature current i by means of feeding the current magnetic flux $\phi s$ and a value of said predetermined function into a second equation, which specifies a quantitative relationship between the current magnetic flux $\phi s$, said predetermined function and the multiple-phase armature current i. By means of using this program, it is possible to compute a motor model at remarkably higher speed than it has been done conventionally as already described.

In a preferable mode, said step of computing the current magnetic flux $\phi s$ comprises the steps of: computing a matrix $\lambda(\theta)$, which is a function being equal to the inverse matrix of an inductance matrix $L(\theta)$ specifying a relationship between the current magnetic flux $\phi s$ and the multiple-phase armature current i; and obtaining a desirable variable value for said equation by feeding the value of said matrix $\lambda(\theta)$ into the equation as the value of the inverse matrix of the inductance matrix $L(\theta)$ which is included in said equation. By means of using this program, it is possible to compute a motor model at remarkably higher speed than it has been done conventionally as already described.

In a preferable mode, said step of computing the matrix $\lambda(\theta)$ comprises the steps of: computing inductance reciprocal functions $\lambda as$ and $\lambda a$ by feeding the reciprocal $\lambda d$ of the d-axis inductance Ld of said alternate-current motor, the reciprocal $\lambda q$ of the q-axis inductance Lq thereof and the reciprocal $\lambda l$ of the leakage inductance Ll thereof into a Mathematical Formula 37 and a Mathematical Formula 38; and $$\lambda as = \frac{1}{3}(\lambda q - \lambda d) \qquad \text{[Mathematical Formula 37]}$$

$$\lambda a = \frac{1}{3}(\lambda q + \lambda d) - \frac{2}{3}\lambda \ell \qquad \text{[Mathematical Formula 38]}$$

computing $\lambda 11$, $\lambda 12$, $\lambda 13$, $\lambda 21$, $\lambda 22$, $\lambda 23$, $\lambda 1$, $\lambda 2$ and $\lambda 33$, the respective elements of the matrix $\lambda(\theta)$, by feeding the computed inductance reciprocal functions $\lambda as$ and $\lambda a$ and the reciprocal $\lambda l$ of the leakage inductance Ll into a Mathematical Formula 39 through a Mathematical Formula 44.

$\lambda_{11} = \lambda l + \lambda a - \lambda as \cos 2\theta$ [Mathematical Formula 39]

$\lambda_{12} = -\frac{1}{2}\lambda a - \lambda as \cos(2\theta - \frac{2}{3}\pi)$ [Mathematical Formula 40]

$\lambda_{13} = -\frac{1}{2}\lambda a - \lambda as \cos(2\theta + \frac{2}{3}\pi)$ [Mathematical Formula 41]

$\lambda_{22} = \lambda l + \lambda a - \lambda as \cos(2\theta + \frac{2}{3}\pi)$ [Mathematical Formula 42]

$\lambda_{23} = -\frac{1}{2}\lambda a - \lambda as \cos 2\theta$ [Mathematical Formula 43]

$\lambda_{33} = \lambda l + \lambda a - \lambda as \cos(2\theta - \frac{2}{3}\pi)$ [Mathematical Formula 44]

$\lambda_{21} = \lambda_{12}$ [Mathematical Formula 45]

$\lambda_{31} = \lambda_{13}$ [Mathematical Formula 46]

$\lambda_{32} = \lambda_{23}$ [Mathematical Formula 47]

By means of using this program, it is possible to compute a motor model at remarkably higher speed than it has been done conventionally as already described.

A simulation method according to a seventh invention is a simulation method of periodically executing a computing step of computing a state of an object model for imitating an operation of a predetermined object, the objective model being defined by an equation which includes the inverse matrix of a predetermined matrix L(θ) being a function changing periodically, thereby simulating the state of said objective model in real time, the state being defined by said objective model, the simulation method comprises the step of: defining a matrix λ(θ), which is a function being equal to said inverse matrix, and computing the respective elements of said matrix λ(θ), thereby performing the computation of the inverse matrix of said matrix L(θ).

By doing thusly, since it is possible to replace the computation of the inverse matrix as a kind of matrix (matrix which includes a variable in at least one of the elements) by carrying out the computation of the matrix λ(θ), it is possible to shorten the processing time for the computation of an objective model which includes a matrix.

In a preferable mode, said objective model is a motor model which is defined by an equation on a stationary coordinate system, the stationary coordinate system specifying a state of an alternate-current motor which comprises a rotor for generating a magnetic-field flux φr and a stator with multiple-phase armature coils wound therearound, said equation including at least a multiple-phase armature current i and a multiple-phase armature voltage U as variables thereof; and said matrix L(θ) is a matrix of inductances of multiple-phase armature coils, inductances whose variable is a rotary angle θ and which specify a relationship between a current magnetic flux φs, which is an armature-coil flux linkage resulting from the multiple-phase armature current i, and the multiple-phase current i. By doing thusly, since the computing process for the simulation of alternate-current motor is adapted to a format that can be calculated readily, it is possible to realize to turn it into a high-speed and high-accuracy one.

In a preferable mode, said matrix λ(θ) is computed based on a d-axis inductance Ld of said alternate-current motor, a q-axis inductance Lq of the alternate-current motor and a leakage inductance Ll thereof. Specifically, in this mode, since the respective elements of the matrix λ(θ) are defined as a function of a d-axis inductance Ld of said alternate-current motor, a q-axis inductance Lq of the alternate-current motor and a leakage inductance Ll thereof, the computation of the respective elements of the matrix λ(θ) becomes simple. Because of this, it is possible to carry out the computation of the matrix λ(θ) at a high speed and with high accuracy.

In a preferable mode, inductance reciprocal functions λas and λa are computed by feeding the reciprocal λd of the d-axis inductance Ld, the reciprocal λq of the q-axis inductance Lq and the reciprocal λl of the leakage inductance Ll into a Mathematical Formula 37 and a Mathematical Formula 38; and $$\lambda as = \frac{1}{3}(\lambda q - \lambda d)$$ [Mathematical Formula 37]

$$\lambda a = \frac{1}{3}(\lambda q + \lambda d) - \frac{2}{3}\lambda l$$ [Mathematical Formula 38]

λ11, λ12, λ13, λ21, λ22, λ23, λ1, λ2 and 133, the respective elements of the matrix λ(θ), are computed by feeding the computed inductance reciprocal functions λas and λa and the reciprocal λl of the leakage inductance λl into a Mathematical Formula 39 through a Mathematical Formula 44.

$$\lambda_{11} = \lambda l + \lambda a - \lambda as \cos 2\theta$$ [Mathematical Formula 39]

$$\lambda_{12} = -\tfrac{1}{2}\lambda a - \lambda as \cos(2\theta - \tfrac{2}{3}\pi)$$ [Mathematical Formula 40]

$$\lambda_{13} = -\tfrac{1}{2}\lambda a - \lambda as \cos(2\theta + \tfrac{2}{3}\pi)$$ [Mathematical Formula 41]

$$\lambda_{22} = \lambda l + \lambda a - \lambda as \cos(2\theta + \tfrac{2}{3}\pi)$$ [Mathematical Formula 42]

$$\lambda_{23} = -\tfrac{1}{2}\lambda a - \lambda as \cos 2\theta$$ [Mathematical Formula 43]

$$\lambda_{33} = \lambda l + \lambda a - \lambda as \cos(2\theta - \tfrac{2}{3}\pi)$$ [Mathematical Formula 44]

$$\lambda_{21} = \lambda_{12}$$ [Mathematical Formula 45]

$$\lambda_{31} = \lambda_{13}$$ [Mathematical Formula 46]

$$\lambda_{32} = \lambda_{23}$$ [Mathematical Formula 47]

By doing thusly, since it is possible to define the respective elements of the matrix λ(θ) much easier, it is possible to compute the respective elements of the matrix λ(θ) at much higher speed and with much higher accuracy.

A simulation program according to the present invention is a simulation program of periodically executing a computing step of computing a state of an objective model for imitating an operation of a predetermined object, the objective model being defined by an equation which includes the inverse matrix of a predetermined matrix L(θ) being a function changing periodically, thereby simulating the state of said objective model in real time, the state being defined by said objective model, and the simulation program comprises the steps of: computing a matrix λ(θ), which is a function being equal to said inverse matrix; and feeding the value of said matrix λ(θ), which is obtained by computing, into said equation by means of adapting it to being the value of said matrix L(P thereby performing a computation of finding a desirable variable for said equation. By doing thusly, it is possible to perform the simulation of the objective model, which is made of the equation including the matrix L(θ) at high speed and with high accuracy, as described already.

MODE FOR EMBODIMENT OF THE INVENTION

Figure 1:
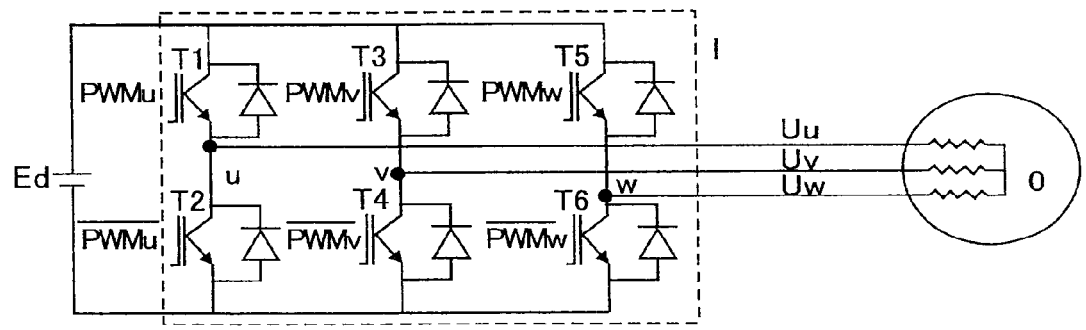
FIG. 1 is a circuit diagram of a 3-phase inverter, which is used for an inverter model of this embodiment.

A computing method of motor model according to a suitable embodiment form of the present invention will be hereinafter explained. However, the present invention is not limited to the following embodiments, and accordingly it is natural that it is allowable to combine known techniques or techniques being equivalent to them to realize the technical ideas according to the present invention. In the following explanations, a 3-phase PM (permanent-magnet magnetic field) type alternate-current motor is used as an example. However, since generating a magnetic flux by a magnet is essentially equivalent to generating a magnetic flux by flowing a magnetic-field current in a magnetic-field coil, it can be applied to magnetic-field coil type alternate-current motors as well. Further, in inductance motors and reluctance (hysteresis) motors, too, in which the magnetic flux, which a rotor generates, is done by the alternate-current current supply from the stator side to the rotator side, it is possible to adopt the following motor model by means of prescribing the magnetic flux in the same manner as the following embodiments.

(First Motor Model)

A first motor model (an equation specifying the relationship between current and voltage) will be hereinafter explained. The relationship between a multiple-phase output alternate-current voltage U of a 3-phase alternate-current motor, a multiple-phase armature current i and a magnetic flux φ passing through multiple-phase armature coils is defined by Mathematical Formula 1 through Mathematical Formula 4.

$$U = RsEi + d\psi/dt \quad \text{[Mathematical Formula 1]}$$

$$U = [UuUvUw]^T \quad \text{[Mathematical Formula 2]}$$

$$i = [iuiviw]^T \quad \text{[Mathematical Formula 3]}$$

$$\psi = [\psi u \psi v \psi w]^T \quad \text{[Mathematical Formula 4]}$$

The φ is a 3-phase armature-coil flux linkage, the Rs is an armature-coil resistance, and the following E is a 3×3 unit matrix and is specified by Mathematical Formula 5.

$$E = (100, 010, 001) \quad \text{[Mathematical Formula 5]}$$

The Uu is a U-phase armature voltage, the Uv is a V-phase armature voltage, and the Uw is a W-phase armature voltage; the Iu is a U-phase armature current; the Iv is a V-phase armature current, and the Iw is a W-phase armature current; and the φu is a U-phase component of the φ, the φv is a V-phase component of the φ, and the φw is a W-phase component of the φ.

In the case of 3-phase PM type synchronous motor model, since the 3-phase armature-coil flux linkage φ is a sum of the 3-phase armature-coil flux linkage φs, which is formed by the 3-phase armature-coil current i, and the 3-phase armature-coil flux linkage φr, which is formed by permanent magnet, it is possible to convert Mathematical Formula 1 into Mathematical Formula 6 through Mathematical Formula 7. Hereinafter, in order to simplify explanations, there might be cases where the 3-phase armature-coil flux linkage φs is referred to as a current magnetic flux and the 3-phase armature-coil flux linkage φr is referred to as a magnetic-field flux. Therefore, Mathematical Formula 5 can be converted into the formats of Mathematical Formula 6 through Mathematical Formula 7.

$$U = RsEi + \frac{d\psi s}{dt} + \frac{d\psi r}{dt} \quad \text{[Mathematical Formula 6]}$$

-continued $$\psi r = [\psi ru \; \psi rv \; \psi rw]^T \quad \text{[Mathematical Formula 7]}$$

However, the φu is a U-phase component of the φs, the φsv is a V-phase component of the φs, and the φsw is a W-phase component of the φs; and the φru is a U-phase component of the φr, the φrv is a V-phase component of the φr, and the φrw is a W-phase component of the φr. The φru, φrv and φrw are defined by following Mathematical Formula 8 through Mathematical Formula 10.

$$\psi ru = \psi m \cos\theta \quad \text{[Mathematical Formula 8]}$$

$$\psi rv = \psi m \cos(\theta - 2/3\pi) \quad \text{[Mathematical Formula 9]}$$

$$\psi rw = \psi m \cos(\theta + 2/3\pi) \quad \text{[Mathematical Formula 10]}$$

The φm is the maximum value of armature-coil flux linkage, which results from permanent magnet, and the θ is a rotor rotary angle. The 3-phase armature-coil flux linkage φs, which is formed by the 3-phase armature-coil current i is defined by Mathematical Formula 11.

$$\psi s = L(\theta) i \quad \text{[Mathematical Formula 11]}$$

The L(θ) is a matrix function, which specifies the relationship between the current magnetic flux φs and the multiple-phase armature-coil current i, that is, an inductance matrix of 3-phase armature coils. The inductance matrix L(θ), in the case of an inductance matrix of cylindrical PM motors, turns into a constant matrix; but, in the case of projection type or inverse-projection type PM motors, turns into a function of rotor rotary angle θ, which is defined by Mathematical Formula 12. In the embodiment below, the case of projection type or inverse-projection type PM motor, in which the computing process is complicated, will be explained.

$$L(\theta) = \begin{bmatrix} Ll + La - Las\cos 2\theta & -1/2La - Las\cos(2\theta - 2/3\pi) & -1/2La - Las\cos(2\theta + 2/3\pi) \\ -1/2La - Las\cos(2\theta - 2/3\pi) & Ll + La - Las\cos(2\theta + 2/3\pi) & -1/2La - Las\cos(2\theta) \\ -1/2La - Las\cos(2\theta + 2/3\pi) & -1/2La - Las\cos(2\theta) & Ll + La - Las\cos(2\theta - 2/3\pi) \end{bmatrix} \quad \text{[Mathematical Formula 12]}$$

However, the Ll is a leakage inductance component of multiple-phase armature coils, the La is a direct-current inductance component of multiple-phase armature coils, and the Las is an alternate-current inductance component of multiple-phase armature coils. Then, by feeding Mathematical Formula 11 into Mathematical Formula 6, Mathematical Formula 6 can be converted into following Mathematical Formula 13.

$$\frac{di}{dt} = L(\theta)^{-1} \left[ -RsEi - \frac{dL(\theta)}{dt} i + U - \frac{d\psi r}{dt} \right] \quad \text{[Mathematical Formula 13]}$$

Therefore, Mathematical Formula 13 turns into an equation using the inductance matrix L(θ), equation which is equivalent to a motor model of PM motor. When using a motor model specified by this Mathematical Formula 13, it becomes possible to directly derive the 3-phase armature current i without carrying out the dq conversion.

Specifically, when using a motor model specified by Mathematical Formula 13, it is possible to define the relationship between the 3-phase armature current i and the 3-phase armature voltage U by means of computing the armature-coil resistance Rs, the inductance matrix $L(\theta)$, the 3-phase armature-coil flux linkage $\phi r$, which is formed by permanent magnet, and the inverse matrix of the inductance matrix $L(\theta)$. Therefore, it is possible to carry out the computation of motor models by means of using Mathematical Formula 13 as a motor model. Since this motor model describes motor models relatively simply by means of using the inductance matrix $L(\theta)$ a matrix function, and the inverse matrix of this inductance matrix $L(\theta)$, it is suitable for computer processing. Note that, by means of substituting the calculation of a later-described matrix $\lambda(\theta)$ for the computation of the inverse matrix of the inductance matrix $L(\theta)$, it is possible to realize a further reduction of the time for computing process.

(Second Motor Model)

A second motor model will be hereinafter explained. This motor model, as described later, does not use aforementioned Mathematical Formula 13, and, instead thereof, is defined by an equation, which describes the relationship between a multiple-phase output alternate-current voltage U and a multi-phase armature current i, using a current magnetic flux $\phi s$. For example, in the computation of this motor model, it is possible to find a 3-phase current i using a 3-phase armature-coil flux linkage $\phi s$, which has been computed in advance. When transforming Mathematical Formula 11, Mathematical Formula 14 is obtainable $$i = L(\theta)^{-1}\psi s \quad \text{[Mathematical Formula 14]}$$

When feeding Mathematical Formula 14 into Mathematical Formula 6, Mathematical Formula 15 and Mathematical Formula 16 are obtainable. Mathematical Formula 16 is equal to Mathematical Formula 14.

$$\frac{d\psi s}{dt} = -RsL(\theta)^{-1}\psi s + U - \frac{d\psi r}{dt} \quad \text{[Mathematical Formula 15]}$$

$$i = L(\theta)^{-1}\psi s \quad \text{[Mathematical Formula 16]}$$

When using Mathematical Formula 15, it is understood that it is possible to abbreviate the complicated computation for deriving $dL(\theta)/dt$, computation which is required in Mathematical Formula 13, that is, the first motor model. In short, it is possible to abbreviate the process for differentiating the inductance matrix $L(\theta)$ by means of using the 3-phase armature-coil flux linkage $\phi s$, which has been computed in advance.

Specifically, in this motor model which is specified by Mathematical Formula 15 and Mathematical Equation 16, by means of computing the armature resistance Rs, the inverse matrix of the inductance matrix $L(\theta)$, the 3-phase armature voltage (being referred to as "multiple-phase armature voltage" as well) U and the magnet magnetic flux $\phi r$, respectively, and feeding them into Mathematical Formula 15, the current magnetic flux $\phi s$ is computed and further the inverse matrix of the inductance matrix $L(\theta)$ is computed; and, by means of feeding the current magnetic flux $\phi s$ and inverse matrix into Mathematical Formula 16, it is thus possible to compute the 3-phase armature-coil current (being referred to as "multiple-phase armature current" as well) i. Therefore, since the computation of this second motor model, compared with the computation of the first motor model that has been explained before, can abbreviate the computing steps remarkably, it can shorten the required computing times of the respective computing steps in simulations; as a result thereof, it can execute the high-speed and high accuracy real-time simulation of motor models by less calculation resources; and it can generate great effects in view of practical use. Further, in this motor-model computation, too, it is possible to realize further shortening of computing time by means of substituting the computation of the matrix $\lambda(\theta)$ for the computation of the inverse matrix of the inductance matrix $L(\theta)$.

(Motor-Torque Calculating Formula)

Note that, in motor-model computation, although the computation of motor torque is desirable, the motor torque can be calculated by means of computing Mathematical Formula 17, for instance, for each of the respective computing steps of simulation because it is a functional value of current. Therefore, in motor models in which the computation of motor torque is necessary, it is advisable to add to following Mathematical Formula 17 to the motor models. Similarly, the electric power consumption, the reactive power, and the other electric quantities and physical quantities, too, can be computed by means of adding equations, which define them, to motor models.

[Mathematical Formula 17]

$$Te = Las\frac{P}{2}\left\{\left(i_u^2 - \frac{1}{2}i_v^2 - \frac{1}{2}i_w^2 - i_u i_v - i_u i_w + 2i_v i_w\right)\sin 2\theta + \frac{\sqrt{3}}{2}(i_v^2 - i_w^2 - 2i_u i_v + 2i_u i_w)\cos 2\theta\right\}$$

Note that the P is the number of poles.

(Computing Method for Inverse Matrix of Inductance Matrix $L(\theta)$)

In the computations of the aforementioned first and second motor models, the computation of the inverse matrix of the inductance matrix $L(\theta)$ becomes necessary. The inverse matrix of the inductance matrix $L(\theta)$ is expressed by the notation of Mathematical Formula 18.

$$L(\theta)^{-1} \quad \text{[Mathematical Formula 18]}$$

When computing the inverse matrix of the inductance matrix $L(\theta)$ with Mathematical Formula 12, since the computing process has got complicated, and since the division whose processing time is longer compared with those of the addition, subtraction and multiplication, the enlargement of the required time for the computation results in an obstacle to making the simulation high-speed and highly accurate. As having been known well, the prolonging time intervals between the computing steps of simulation brings about the lowering of computing accuracy.

Hence, in this Embodiment, the inverse matrix of the inductance matrix $L(\theta)$ is computed by the following computing method. The inductance matrix $L(\theta)$, which is specified with Mathematical Formula 12, is rewritten into the format of the arithmetic sum of respective matrix functions L1, L2 and L3, which are specified in Mathematical Formula 19 through Mathematical Formula 22. The matrix function L1 is specified by Mathematical Formula 20, the matrix function L2 is specified by Mathematical Formula 21, and the matrix function L3 is specified by Mathematical Formula 22.

$$L(\theta) = L_1 + L_2 + L_3 \quad \text{[Mathematical Formula 19]}$$

-continued $$L_1 = \begin{bmatrix} Ll + 3/2La & 0 & 0 \\ 0 & Ll + 3/2La & 0 \\ 0 & 0 & Ll + 3/2La \end{bmatrix}$$ [Mathematical Formula 20]

$$L_2 = \begin{bmatrix} -1/2La & -1/2La & -1/2La \\ -1/2La & -1/2La & -1/2La \\ -1/2La & -1/2La & -1/2La \end{bmatrix}$$ [Mathematical Formula 21]

$$L_3 = $$ [Mathematical Formula 22]

$$\begin{bmatrix} -Las\cos 2\theta & -Las\cos\left(2\theta - \frac{2}{3}\pi\right) & -Las\cos\left(2\theta + \frac{2}{3}\pi\right) \\ -Las\cos\left(2\theta - \frac{2}{3}\pi\right) & -Las\cos\left(2\theta + \frac{2}{3}\pi\right) & -Las\cos(2\theta) \\ -Las\cos\left(2\theta + \frac{2}{3}\pi\right) & -Las\cos(2\theta) & -Las\cos\left(2\theta - \frac{2}{3}\pi\right) \end{bmatrix}$$

Next, a matrix function $Lc(\theta)$ is set up anew, and this matrix function $Lc(\theta)$ is defined by Mathematical Formula 23 through Mathematical Formula 25.

$$Lc(\theta) = CL(\theta)C^{-1}$$ [Mathematical Formula 23]
$$= C(L_1 + L_2 + L_3)C^{-1}$$
$$= CL_1C^{-1} + CL_2C^{-1} + CL_3C^{-1}$$

$$C = $$ [Mathematical Formula 24]

$$\sqrt{\frac{2}{3}} \begin{bmatrix} \cos\theta & \cos\left(\theta - \frac{2}{3}\pi\right) & \cos\left(\theta + \frac{2}{3}\pi\right) \\ -\sin\theta & -\sin\left(\theta - \frac{2}{3}\pi\right) & -\sin\left(\theta + \frac{2}{3}\pi\right) \\ \frac{1}{\sqrt{2}} & \frac{1}{\sqrt{2}} & \frac{1}{\sqrt{2}} \end{bmatrix}$$

$$C^{-1} = $$ [Mathematical Formula 25]

$$\sqrt{\frac{2}{3}} \begin{bmatrix} \cos\theta & -\sin\theta & \frac{1}{\sqrt{2}} \\ \cos\left(\theta - \frac{2}{3}\pi\right) & -\sin\left(\theta - \frac{2}{3}\pi\right) & \frac{1}{\sqrt{2}} \\ \cos\left(\theta + \frac{2}{3}\pi\right) & -\sin\left(\theta + \frac{2}{3}\pi\right) & \frac{1}{\sqrt{2}} \end{bmatrix}$$

When calculating the respective terms of Mathematical Formula 23, Mathematical Formula 26 through Mathematical Formula are obtainable.

$$CL_1C^{-1} = \begin{bmatrix} Ll + 3/2La & 0 & 0 \\ 0 & Ll + 3/2La & 0 \\ 0 & 0 & Ll + 3/2La \end{bmatrix}$$ [Mathematical Formula 26]

$$CL_2C^{-1} = \begin{bmatrix} 0 & 0 & 0 \\ 0 & 0 & 0 \\ 0 & 0 & -3/2La \end{bmatrix}$$ [Mathematical Formula 27]

$$CL_3C^{-1} = \begin{bmatrix} -3/2Las & 0 & 0 \\ 0 & 3/2La & 0 \\ 0 & 0 & 0 \end{bmatrix}$$ [Mathematical Formula 28]

When arranging the matrix function $Lc(\theta)$, which is equal to the sum of the respective terms that are defined by Mathematical Formula 26 through Mathematical Formula 28 respectively, this matrix function $Lc(\theta)$ turns into Mathematical Formula 29.

$$Lc(\theta) = \begin{bmatrix} Ld & 0 & 0 \\ 0 & Lq & 0 \\ 0 & 0 & Ll \end{bmatrix}$$ [Mathematical Formula 29]

However, the Ld is a d-axis inductance of armature coil, and is defined with Mathematical Formula 30. The Lq is a q-axis inductance of armature coil, and is defined with Mathematical Formula 31.

$$Ld = Ll + 3/2(La - Las)$$ [Mathematical Formula 30]

$$Lq = Ll + 3/2(La + Las)$$ [Mathematical Formula 31]

The inverse matrix of the matrix function $Lc(\theta)$, which is specified in Mathematical Formula 29, turns into the form of following Mathematical Formula 32.

$$Lc(\theta)^{-1} = \begin{bmatrix} \lambda d & 0 & 0 \\ 0 & \lambda q & 0 \\ 0 & 0 & \lambda l \end{bmatrix}$$ [Mathematical Formula 32]

$$\lambda d = 1/Ld \cdot \lambda q = 1/Lq \cdot \lambda l = 1/Ll$$

However, $\lambda d = 1/Ld$, $\lambda q = 1/Lq$, and $\lambda l = 1/Ll$. Specifically, the respective elements of the functional matrix $Lc(\theta)$, which are not 0, turn into the inverse $\lambda d$ of the d-axis inductance Ld of armature coil, the inverse $\lambda q$ of the q-axis inductance Lq of armature coil, and the inverse $\lambda l$ of the leakage inductance Ll.

Next, when finding the inverse matrix of the inductance matrix $L(\theta)$ from Mathematical Formula 23, it turns into following Mathematical Formula 33.

$$L(\theta)^{-1} = C^{-1}Lc(\theta)^{-}C$$ [Mathematical Formula 33]

Here, since the conversion matrix C is an absolute conversion matrix, following Mathematical Formula 34 and Mathematical Formula 35 are established.

$$C^{-1} = C^T$$ [Mathematical Formula 34]

$$[L(\theta)^{-1}]^T = [C^{-1}Lc(\theta)^{-1}C]^T = C^T[Lc(\theta)^{-1}]^T[C^{-1}]^T = C^{-1}Lc(\theta)^{-1}C = L(\theta)^{-1}$$ [Mathematical Formula 35]

Therefore, it is understood that the inverse matrix of the inductance matrix $L(\theta)$ is a symmetric matrix. Next, three variables $\lambda(\theta)$, $\lambda as$ and $\lambda a$ are defined anew by Mathematical Formula 36 through Mathematical Formula 38. Mathematical Formula 36 is a matrix $\lambda(\theta)$ that is equal to the inverse matrix of the inductance matrix $L(\theta)$.

$$\lambda(\theta) = \{\lambda ij(\theta)\}_{3\times 3} = L(\theta)^{-1}$$ [Mathematical Formula 36]

-continued $$\lambda as = \frac{1}{3}(\lambda q - \lambda d) \quad \text{[Mathematical Formula 37]}$$

$$\lambda a = \frac{1}{3}(\lambda q + \lambda d) - \frac{2}{3}\lambda \ell \quad \text{[Mathematical Formula 38]}$$

When arranging Mathematical Formula 35 using variables $\lambda(\theta)$, $\lambda as$ and $\lambda a$, which are defined by Mathematical Formula 36 through Mathematical Formula 38, following Mathematical Formula 39 through Mathematical Formula 47, which are the respective elements of the matrix function $\lambda(\theta)$ of Mathematical Formula 36, are obtainable.

$$\lambda_{11} = \lambda l + \lambda a - \lambda as \cos 2\theta \quad \text{[Mathematical Formula 39]}$$

$$\lambda_{12} = -\tfrac{1}{2}\lambda a - \lambda as \cos(2\theta - \tfrac{2}{3}\pi) \quad \text{[Mathematical Formula 40]}$$

$$\lambda_{13} = -\tfrac{1}{2}\lambda a - \lambda as \cos(2\theta + \tfrac{2}{3}\pi) \quad \text{[Mathematical Formula 41]}$$

$$\lambda_{22} = \lambda l + \lambda a - \lambda as \cos(2\theta + \tfrac{2}{3}\pi) \quad \text{[Mathematical Formula 42]}$$

$$\lambda_{23} = -\tfrac{1}{2}\lambda a - \lambda as \cos 2\theta \quad \text{[Mathematical Formula 43]}$$

$$\lambda_{33} = \lambda l + \lambda a - \lambda as \cos(2\theta - \tfrac{2}{3}\pi) \quad \text{[Mathematical Formula 44]}$$

$$\lambda_{21} = \lambda_{12} \quad \text{[Mathematical Formula 45]}$$

$$\lambda_{31} = \lambda_{13} \quad \text{[Mathematical Formula 46]}$$

$$\lambda_{32} = \lambda_{23} \quad \text{[Mathematical Formula 47]}$$

After all, it is understood that it is possible to compute the inverse matrix of the inductance matrix $L(\theta)$ by simply computing the matrix function $\lambda(\theta)$, which is calculated by means of computing Mathematical Formula 39 through Mathematical Formula 47 using $\lambda as$ and $\lambda a$ being derived from Mathematical Formula 37 through Mathematical Formula 38. That is, when following the aforementioned computing procedure, it follows that it becomes feasible to compute the inverse matrix of the inductance matrix $L(\theta)$ more simply remarkably than it has been done conventionally because this computing manner of the inverse matrix of the inductance matrix $L(\theta)$ can be carried out by substituting the computation of the matrix $\lambda(\theta)$ for the computation of the inverse matrix of the inductance matrix $L(\theta)$.

In a comparative example in which it was carried out actually on an identical apparatus, it was verified that the time required for the computation of the inverse matrix of the inductance matrix $L(\theta)$ by this Embodiment could be shortened amazingly to about $\frac{1}{7}$ of that of conventional one.

(dq Rotary Coordinate System Computing Unit)

Next, an equation, which effectively constitutes a dq rotary coordinate system computing unit for carrying out a coordinate-system conversion used optionally in this Embodiment, will be hereinafter explained. However, in the following explanations, i is a three-phase armature current in a stationary-coordinate-system expression, and U is a three-phase armature voltage in a stationary-coordinate-system expression; Id is a d-axis armature current, Iq is a q-axis armature current, and Io is a zero-phase current; and Ud is a d-axis armature voltage, Uq is a q-axis armature current, and Uo is a zero-phase armature voltage. Mathematical Formula 50 specifies an armature current phase angle on the d-axis basis, and Mathematical Formula 51 specifies an armature voltage phase angle on the d-axis basis.

$$Idq_0 = C^T i \quad \text{[Mathematical Formula 48]}$$

$$Udq_0 = C^T U \quad \text{[Mathematical Formula 49]}$$

$$\alpha i = \arctan\left(\frac{iq}{id}\right) \quad \text{[Mathematical Formula 50]}$$

$$\alpha u = \arctan\left(\frac{Uq}{Ud}\right) \quad \text{[Mathematical Formula 51]}$$

$$Idq_0 = [Id, Iq, I_0]^T \quad \text{[Mathematical Formula 52]}$$

$$Udq_0 = [Ud, Uq, U_0]^T \quad \text{[Mathematical Formula 53]}$$

That is, since the 3-phase armature current i and 3-phase armature voltage U on a stationary coordinate system have been already computed in advance, it is possible to express a current motor state on a dq rotary coordinate system by the simple coordinate system computing process alone without computing the rotary-coordinate-system motor model.

(3-Phase Inverter Model)

Next, a circuit equation, which is usable as a 3-phase inverter model, will be hereinafter explained. A circuit diagram of this 3-phase inverter is illustrated in FIG. 1. Since the constitution of the 3-phase inverter shown in FIG. 1 and the PWM operation itself have been known, their explanations will be omitted. T1 through T6 are switching elements, which constitute the 3-phase inverter, but shall not be limited to the IGBT. PWMu is a PWM control signal (being referred to as "PWM input signal" as well), which is applied to the switching element T1 of a U-phase upper arm, PWMv is a PWM control signal, which is applied to the switching element T2 of a V-phase upper arm, PWMw is a PWM control signal, which is applied to the switching element T3 of a W-phase upper arm. When neglecting the dead time, PWM control signals, which are the inverse pulse signals to the PWM control signals being applied to the switching elements of the same phases' upper arms, are applied to the switching elements of the lower arms of the respective phases' half-bridges. Line voltages Uuv, Uvw and Uwu and phase voltages Uu, Uv and Uw possess the relationship of Mathematical Formula 54, and the respective phases PWM control signals and the line voltages possess the relationship of Mathematical Formula 55.

$$\begin{cases} Uuv = Uu - Uv \\ Uvw = Uv - Uw \\ Uv + Uv + Uw = 0 \end{cases} \quad \text{[Mathematical Formula 54]}$$

$$\begin{aligned} Uuv &= (PWMu - PWMv)Ed \\ Uvw &= (PWMv - PWMw)Ed \end{aligned} \quad \text{[Mathematical Formula 55]}$$

From Mathematical Formulas 54 and 55, following Mathematical Formula 56 is obtainable. The Ed is a battery voltage which is fed to the 3-phase inverter Therefore, Mathematical Formula 56 is a 3-phase inverter model, a real-time simulation of the 3-phase inverter is made feasible using this circuit equation.

$$\begin{bmatrix} Uu \\ Uv \\ Uw \end{bmatrix} = \begin{bmatrix} 2 & -1 & -1 \\ -1 & 2 & -1 \\ -1 & -1 & 2 \end{bmatrix} \begin{bmatrix} PWMu \\ PWMv \\ PWMw \end{bmatrix} * \frac{1}{3} Ed \quad \text{[Mathematical Formula 56]}$$

This model of the 3-phase inverter can process the computation at high speed using a matrix computing processor and so on, because it defines the relationship between the PWM control signals and the multiple-phase armature phase U using a matrix function; and is additionally very convenient when using it for a real-time simulation of the first motor model and the second motor model, because it can output the multiple-phase armature voltage U at high speed as the input parameter for the stationary-coordinate-system motor models which have been described already.

(Correction of PWM Control Signals)

A case where the respective steps of a simulation of alternate-current motor controlling algorithm are computed at regular time intervals using the aforementioned 3-phase inverter model and 3-phase alternate-current motor model will be hereinafter considered with reference to the timing chart of FIG. 2.

Figure 2:
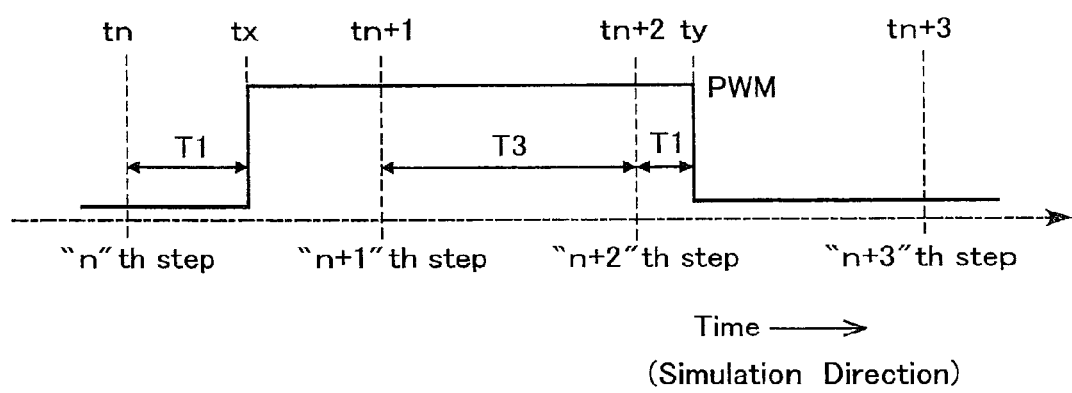
FIG. 2 is a timing chart for explaining a PWM-control-signal correction of this embodiment.

In FIG. 2, let tn be the time of reading data at an "n"th step, tn+1 be the time of reading data at an "n+1"th step, tn+2 be the time of reading data at an "n+2"th step, and tn+3 be the time of reading data at an "n+3"th step; and let a PWM control signal have undergone a step change at a time tx between two neighboring time t1 and tn+1. However, since this step change of the PWM control signal is not read for the computation until it becomes the time tn+1, this step change of the PWM control signal is not reflected in the simulation between the time tx, at which the PWM control signal has changed, and the time tn+1 immediately thereafter; as a result thereof, the lowering of simulation accuracy arises. When the PWM control signal undergoes a step change at the time ty between the time tn+2 and the time tn+3, too, the same problem arises.

Hence, in this Embodiment, when the PWM control signal has undergone a step change between the data-reading time tm of this round and the data-reading time tm−1 of the previous round immediately before it, it is advisable to use an average value as a value of this round's PWM control signal; and, when the PWM control signals coincide with each other between the data-reading time tm of this round and the data-reading time tm−1 of the previous round immediately before it, it is advisable to use the current PWM control signal. Note that this average value becomes (Ts−Tc)/Ts when the PWM control signal changes from 0 to 1; and becomes Tc/Ts when the PWM control signal changes from 1 to 0. The Ts is a step interval, and Tc is a time, which is counted from the data-reading time tm−1 of the previous round and up to the time to at which the PWM control signal has undergone a step change. This correction of the PWM control signal can be carried out by means of processing the flow chart illustrated in FIG. 3.

Let us consider further, if the step interval Ts is constant, this average value of the PWM control signal can be calculated at once when the time Tc, which is counted from the data-reading time tm−1 of the previous round and up to the time to at which the PWM control signal has undergone a step change, is found out; and additionally whether or not the PWM control signal has undergone a step change can be distinguished at the time to at which the PWM control signal has undergone a step change. Hence, independently of a main routine for carrying out the processing of the steps for the simulation, when carrying out the processing of making distinction on the step change of the PWM control signal as well as counting the aforementioned time Tc at shorter step intervals than those of the former processing, it is possible to read this average value of the PWM control signal as the PWM control signal at once when it arrives at the data-reading time of this round, and it is thereby possible to inhibit the time extension of the processing steps.

(Formulation of HILS System)

Figure 4:
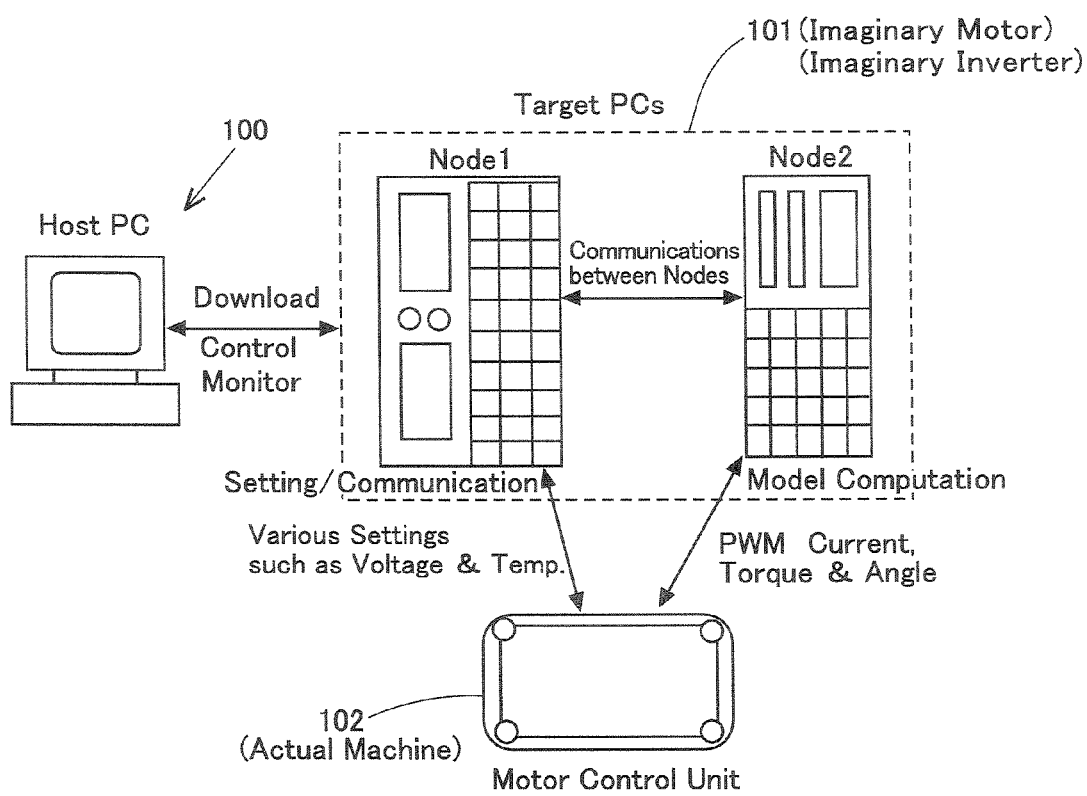
FIG. 4 is a block diagram for specifying an HILS system, which is used in this embodiment.

An HILS (hardware-in-the-loop simulation) system of motor control system, HILS system which uses the above-explained motor models and inverter model, is illustrated in FIG. 4. 100 is a host PC, and 101 is target PCs, which are composed of one or a plurality of computers. Although 102 is a motor controller (actual machine) for controlling motor, it can be adapted to being a computer, which is actually equipped with an imaginary motor control program which carries out simulation operations being equivalent those of it.

The target PCs 101 store programs, which make the aforementioned motor models and inverter model corresponding to one or a plurality of 3-phase PM type alternate-current motors and a 3-phase inverter for operating the motors, and simulate the states of the alternate-current motors and inverter, which are turned into the models, by means of computing these programs.

The motor controller 102 is constituted of a computer device for storing a motor control program for executing predetermined motor control algorithm, or a hardware device, which possesses functions being equivalent to it. The motor controller 102 reads the motors's states and inverter's states out of the target PCs 101 at predetermined periods, executes the aforementioned motor control algorithm based on them, and transmits commands, which are obtained as a result thereof, to the motors and inverter. By means of this, the three sets of the alternate-current motors and inverter, which are imitated by the target PCs 101, are controlled according to the motor control algorithm of the motor controller 102.

The host PC 100 is used for formulating initial types of the aforementioned motor models and inverter model as well as the PWM signal generation algorithm by introducing a variety constants into them, and so forth. The aforementioned initial programs, which are formulated on the host PC 100, are thereafter downloaded to the target PCs 101. Moreover, while the target PCs 101 are running, the host PC 100 is used for outputting a variety of commands to the target PCs 101; is used for receiving the states of the motor model on a dq rotary coordinate system, which is obtained by being subjected to the coordinate-axes conversion, and displaying them on a monitor; and is used for data communications for altering a part of the initial models on the target PCs 101, as well. When explaining this further, the aforementioned models, which are formulated on the host PC 100 and are downloaded to the target PCs 101, are usually called an HILS system. The formulation of such an HILS system can be carried out using "Matlabs/Simulink" of MathWork Corp., for instance.

In this Embodiment, the algorithm, which is constituted of the programs being executed at the target PCs 101 to constitute the major part of an HILS system, is divided into a model computing unit, and a system setting unit; and can suitably be executed by a plurality of computers, which constitute the target PCs 101, separately, after it is downloaded to the target PCs 101, in order to shorten the times required for processing the computing steps.

The model computing unit includes a PWM-control-signal generation algorithm, and computes the PWM control signal based on this PWM-control-signal generation algorithm. The model computing unit includes an algorithm, which makes the inverter model, and inputs the PWM control signal and a voltage command value into this inverter model to compute a 3-phase input voltage to be output to the motors. The model computing unit includes an algorithm, which makes either one of the above-described first motor model or second motor model, and inputs the 3-phase input voltage into this motor model to compute a current, a rotor angle and a motor torque and then output them. The model computing unit includes an algorithm, which makes the above-described dq-rotary-coordinate-system computing unit (coordinate-system conversion program), and operates to compute necessary data on the dq coordinate system periodically or only when it receives a command from the outside.

The system setting unit comprises programs, which make models (algorithms) of the temperatures and voltages of respective parts whose explanations are omitted, other than the aforementioned motor models and inverter model. For example, it comprises a program for computing an armature temperature in compliance with a current history and computing the armature resistance Rs based on the armature current. This program is computed periodically in parallel with the computation of the motor models, that is, in parallel with the running of the imaginary motors, and writes the value of the obtained armature resistance Rs to the armature resistance Rs in the motor models periodically. Thus, it is possible to appropriately alter the motor characteristic values as the constant values of the motor models during the computation of the motor models. This alteration can be carried out from the outside.

A Simulink model is thusly formulated on the host PC 100. Next, this Simulink model is executed on the host PC 100 in non-real time to carry out a basic verification of the Simulink model.

Next, the model computing unit and system setting unit, which are formulated as aforementioned, are converted respectively into a model description language, which is computable with the target PCs 101, a C language format, for instance; and are then downloaded to the target PCs 101. The target PCs 101 compile the downloaded programs to form executable files. Note that, for the operation systems of the target PCs 101, those which are suitable for real-time simulation, a QNX, for instance, can be selected.

Next, a simulation operation is directed from the host PC 100 to the target PCs 101; and then a variety of variables, such as the revolving speed, the revolving direction, the torque and the voltage, are input from the host PC 100 during the execution of this simulation operation, thereby carrying out the verification and debugging of the motor control system's operations.

In accordance with the thus constructed motor control system, it is possible to realize a high-speed and high-accuracy simulation with small-sized calculation resources, because the above-described models are used and the correction of the PWM control signal is carried out as well.

(Computational Processing of Motor Models)

Figure 5:
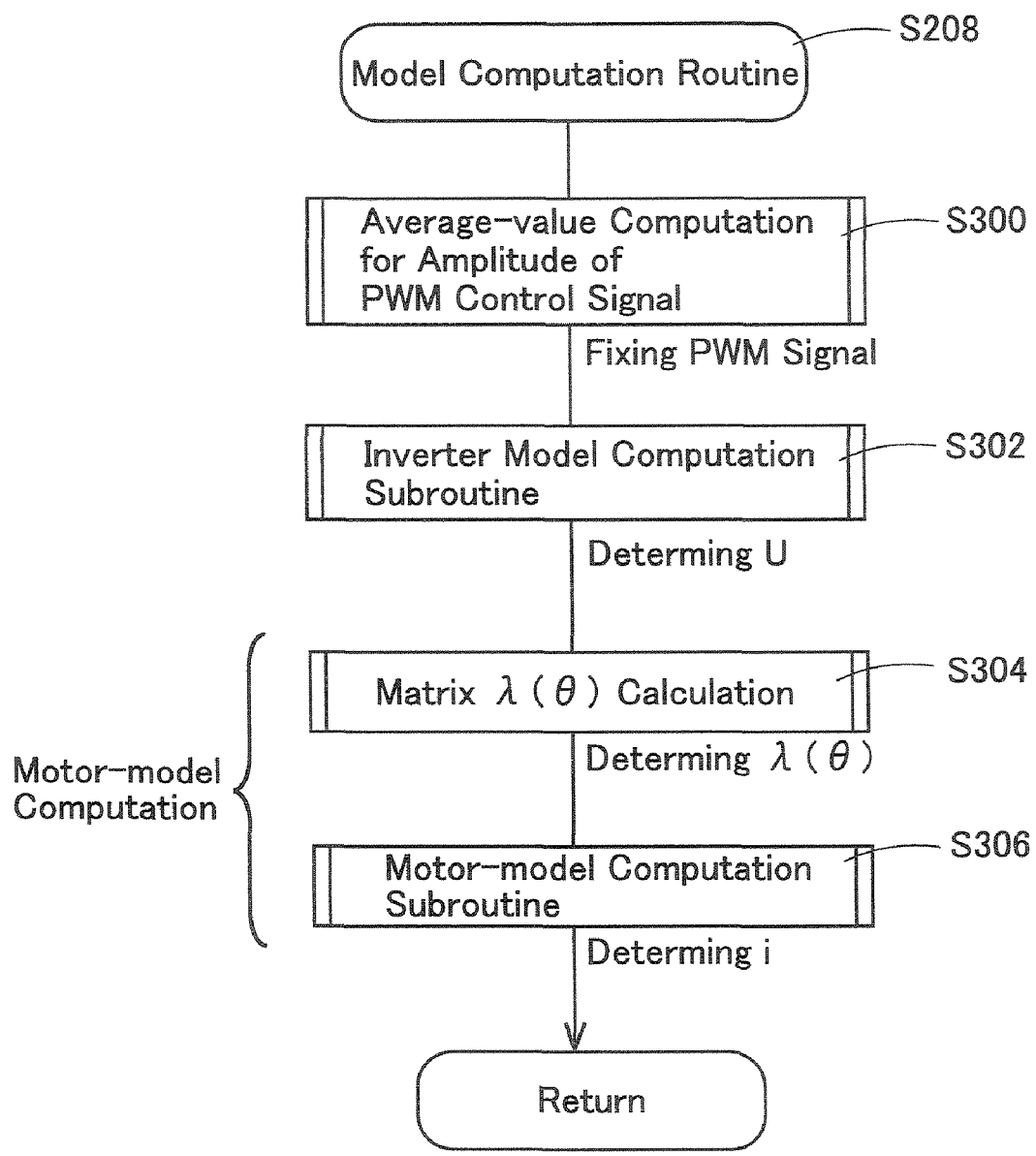
FIG. 5 is a flow chart for specifying an example of an execution routine for a computing step, which is done by a model computing unit at constant periods for the computation of motor model.
Figure 6:
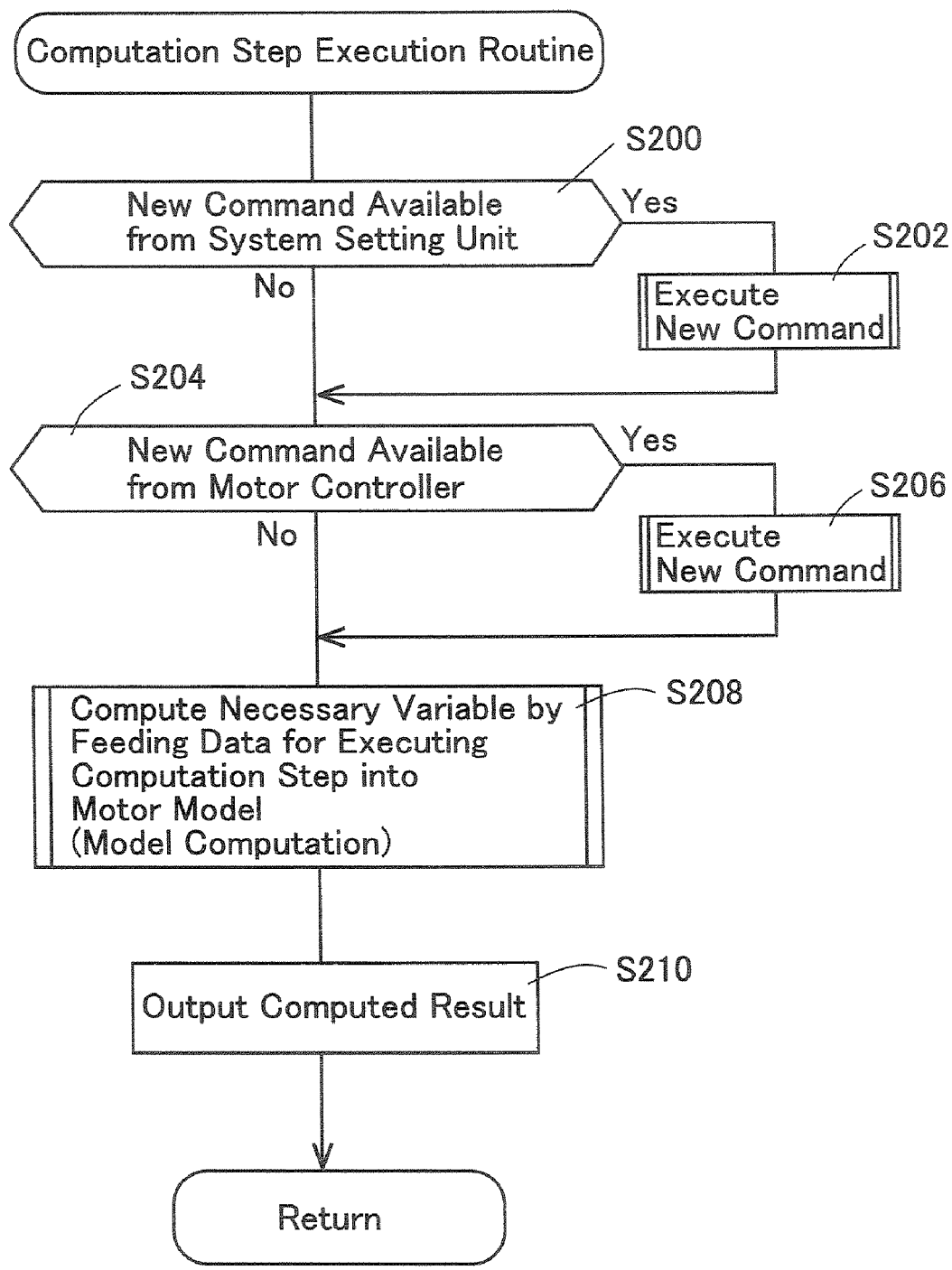
FIG. 6 is a flow chart for specifying a model computation routine of FIG. 5.

The computing steps, the major operations of the model computing unit which is constituted of the programs being downloaded to the target PCs 101, will be further explained with reference to FIG. 5 and FIG. 6. Note that FIG. 5 illustrates a flow chart, which shows an example of an executable routine for the computing steps being done by the model computing unit at constant periods for the computation of the motor models, and that FIG. 6 illustrates a flow chart, which shows a model computable routine of FIG. 5. Note that the computing steps are repeated at predetermined short periods (10 μsec, for instance). Moreover, the communications between the system setting unit and the motor controller 102 shall be executed with a different program independently.

In FIG. 5, first of all, whether a new command, such as a model-variables alteration, is input from the system setting unit 201 or not is judged, when it has been input, a later-described model computation is interrupted, and then this new command is executed at Step S202. Thus, a quick model modification of the inverter model or motor models becomes feasible.

Thereafter, whether a new command concerning an alteration of the motor states is input from the motor controller 102 or not is judged, when it has been input, a later-described model computation is interrupted, and then this new command is executed at Step S206.

Figure 3:
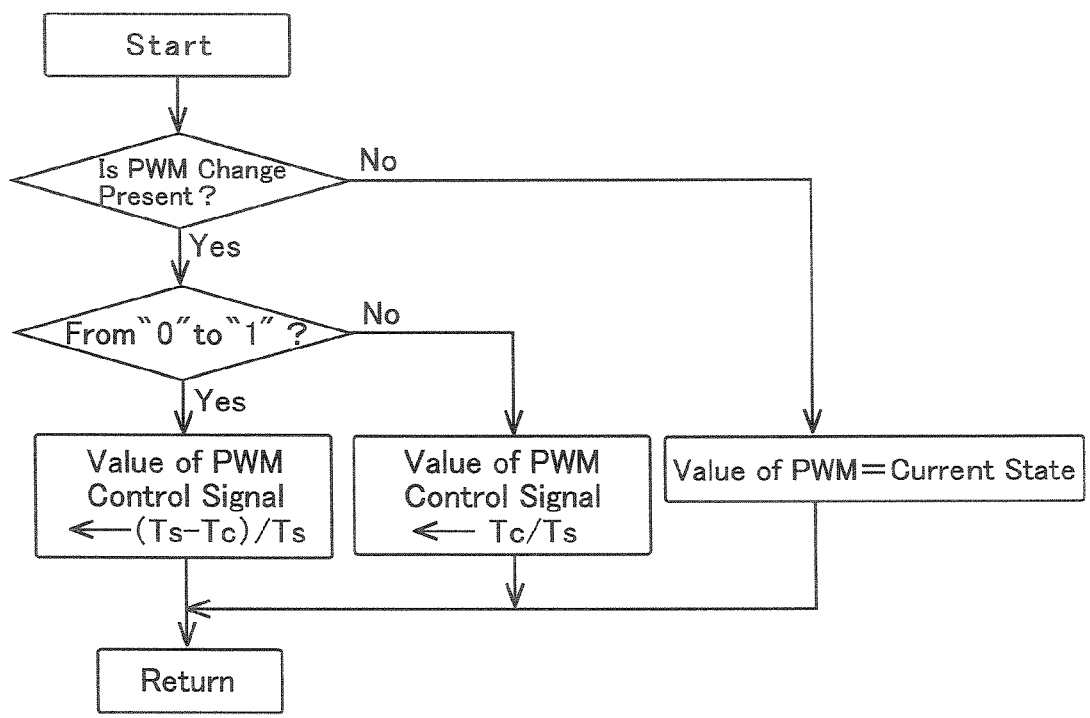
FIG. 3 is a flow chart for explaining a PWM-control-signal correction of this embodiment.

Next, the rotary angle θ, which is computed in the previous round, and the PWM control signal, which is input from a not-shown PWM-control-signal generating circuit, are introduced into the routine, which is shown in FIG. 3, thereby fixing a PWM control signal pwm so as to include its amplitude average value (S300). Note that it is advisable as well to execute this routine at step S300 independently of the execution of this model computable routine at S208 and employ an executed result of the routine alone in this step.

Next, an inverter-model computation subroutine, which carries out the already-described inverter model computation, is executed (S302) Since the detail of this subroutine is as having been described already, the repetitive explanation is omitted.

Next, steps S304 and S306, which carry out the motor-models computation, are executed. First of all, at step S304, the value of the matrix $\lambda(\theta)$ is computed, and subsequently the value of this matrix $\lambda(\theta)$ that is, the value of the inverse matrix of the inductance matrix $L(\theta)$ is fed into the already-described equation, which corresponds to the motor models, along with the other data values, thereby computing desirable variables such as the multiple-phase armature current i, (S306). The computed values, which specify this round's states of the motor models, are output to the motor controller 102 and system setting unit at step S210. The system setting unit transmits received this round's states of the motor models to the host PC 100 and motor controller 102 as the need arises.

What is claimed is:

1. A computer implemented method of modeling control of an electric motor using a model of a motor, the method using a motor model which is defined by an equation on a stationary coordinate system, the stationary coordinate system specifying a state of an alternate-current motor which comprises a rotor for generating a magnetic-field flux φr and a stator with multiple-phase armature coils wound therearound, said equation including at least a multiple-phase armature current i and a multiple-phase armature voltage U as variables thereof, and the method comprising the steps of:

formulating, utilizing the computer, a motor model in which the inverse matrix of an inductance matrix $L(\theta)$, which is a predetermined function whose variable is a rotary angle θ, is converted into a matrix $\lambda(\theta)$, which is a function whose variable is the rotary angle θ; and computing, utilizing the computer, the matrix $\lambda(\theta)$ to compute the value of the inverse matrix of the inductance matrix $L(\theta)$, and feeding the value of the inverse matrix into the equation, which makes said motor model, thereby obtaining resultant values, wherein the inductance matrix $L(\theta)$ is a matrix of inductances of multiple-phase armature coils, the inductances specifying a relationship between a current magnetic flux φs, which is an armature-coil flux linkage resulting from the multiple-phase armature current i, and the multiple-phase armature current i, and wherein the inverse matrix of the inductance matrix L(θ) is computed by means of computing said matrix λ(θ) based on a d-axis inductance Ld of said alternate-current motor, a q-axis inductance Lq of the alternate-current motor and a leakage inductance Ll thereof.

2. The method according to claim 1, wherein inductance reciprocal functions λas and λa are computed by feeding the reciprocal λd of the d-axis inductance Ld, the reciprocal λq of the q-axis inductance Lq and the reciprocal λl of the leakage inductance Ll into a Mathematical Formula 37 and a Mathematical Formula 38; and $$\lambda as = \frac{1}{3}(\lambda q - \lambda d)$$ [Mathematical Formula 37]

$$\lambda a = \frac{1}{3}(\lambda q + \lambda d) - \frac{2}{3}\lambda \ell$$ [Mathematical Formula 38]

λ11, λ12, λ13, λ21, λ22, λ23, λ31, λ32 and λ33, the respective elements of the matrix λ(θ), are computed by feeding the computed inductance reciprocal functions λas and λa and the reciprocal λl of the leakage inductance Ll into a Mathematical Formula 39 through a Mathematical Formula 44

$$\lambda_{11} = \lambda l + \lambda a - \lambda as \cos 2\theta$$ [Mathematical Formula 39]

$$\lambda_{12} = -\frac{1}{2}\lambda a - \lambda as \cos(2\theta - \frac{2}{3}\pi)$$ [Mathematical Formula 40]

$$\lambda_{13} = -\frac{1}{2}\lambda a - \lambda as \cos(2\theta + \frac{2}{3}\pi)$$ [Mathematical Formula 41]

$$\lambda_{22} = \lambda l + \lambda a - \lambda as \cos(2\theta + \frac{2}{3}\pi)$$ [Mathematical Formula 42]

$$\lambda_{23} = -\frac{1}{2}\lambda a - \lambda as \cos 2\theta$$ [Mathematical Formula 43]

$$\lambda_{33} = \lambda l + \lambda a - \lambda as \cos(2\theta - \frac{2}{3}\pi)$$ [Mathematical Formula 44]

$$\lambda_{21} = \lambda_{12}$$ [Mathematical Formula 45]

$$\lambda_{31} = \lambda_{13}$$ [Mathematical Formula 46]

$$\lambda_{32} = \lambda_{23}.$$ [Mathematical Formula 47]

3. A computer implemented method of modeling control of an electric motor using a model of a motor, the method using a motor model which is defined by an equation on a stationary coordinate system, the stationary coordinate system specifying a state of an alternate-current motor which comprises a rotor for generating a magnetic-field flux ψr and a stator with multiple-phase armature coils wound therearound, said equation including at least a multiple-phase armature current i and a multiple-phase armature voltage U as variables thereof, and the computing method being a computing method of motor model computing another values of said variables by feeding numerical values into predetermined variables, the method comprising the step of:

forming, utilizing the computer, the motor model using:

a first equation, which specifies a quantitative relationship between a current magnetic flux ψs, which is an armature-coil flux linkage resulting from the multiple-phase armature current i, a predetermined function whose variable is a rotary angle θ and the multiple-phase armature voltage U, and a second equation, which specifies a quantitative relationship between the current magnetic flux ψs, said predetermined function and the multiple-phase armature current i, wherein the current magnetic flux ψs is computed by means of feeding said predetermined function and a value of the multiple-phase armature voltage U into said first equation, wherein the multiple-phase armature current i is computed by means of feeding the current magnetic flux ψs and a value of said predetermined function into said second equation, wherein said predetermined function is an inverse matrix of inductance matrix L(θ), which is a predetermined matrix whose variable is the rotary angle θ, and wherein said inductance matrix L(θ) is a matrix of inductances of the multiple-phase armature coils, the inductances specifying a relationship between the current magnetic flux ψs, which is an armature-coil flux linkage resulting from the multiple-phase armature current i, and the multiple-phase current i, said inverse matrix is equal to a matrix λ(θ), and the respective elements of said matrix λ(θ) are functional values of a d-axis inductance Ld of said alternate-current motor, a q-axis inductance Lq of the alternate-current motor and a leakage inductance Ll thereof.

4. A non-transitory computer readable medium having stored thereon a motor-model computing program for computing a motor model, the motor model being defined by an equation on a stationary coordinate system, the stationary coordinate system specifying a state of an alternate-current motor which comprises a rotor for generating a magnetic-field flux ψr and a stator with multiple-phase armature coils wound therearound, said equation including at least a multiple-phase armature current i and a multiple-phase armature voltage U as variables thereof, the motor-model computing program comprising the steps of:

computing a matrix λ(θ), being constituted of a function whose variable is a rotary angle θ, and additionally being a function which is equal to the inverse matrix of an inductance matrix L(θ) which specifies a relationship between a current magnetic flux ψs, which is an armature-coil flux linkage resulting from the multiple-phase armature current i, and the multiple-phase armature current i; and obtaining resultant values of said equation by feeding the value of said matrix λ(θ) into the equation as the value of the inverse matrix of the inductance matrix L(θ), which is included in said equation, wherein the step of computing said matrix λ(θ) comprises the steps of:

computing inductance reciprocal functions λas and λa by feeding the reciprocal λd of d-axis inductance Ld of said alternate-current motor, the reciprocal λq of q-axis inductance Lq thereof and the reciprocal λl of leakage inductance Ll thereof into a Mathematical Formula 37 and a Mathematical Formula 38, and $$\lambda as = \frac{1}{3}(\lambda q - \lambda d)$$ [Mathematical Formula 37]

$$\lambda a = \frac{1}{3}(\lambda q + \lambda d) - \frac{2}{3}\lambda \ell$$ [Mathematical Formula 38]

computing λ11, λ12, λ13, λ21, λ22, λ23, λ31, λ32 and λ33, the respective elements of the matrix λ(θ), by feeding the computed inductance reciprocal functions λas and λa and the reciprocal λl of the leakage inductance Ll into a Mathematical Formula 39 through a Mathematical Formula 44

$\lambda_{11} = \lambda l + \lambda a - \lambda as \cos 2$ [Mathematical Formula 39]

$\lambda_{12} = -\frac{1}{2}\lambda a - \lambda as \cos(2\theta - \frac{2}{3}\pi)$ [Mathematical Formula 40]

$\lambda_{13} = -\frac{1}{2}\lambda a - \lambda as \cos(2\theta + \frac{2}{3}\pi)$ [Mathematical Formula 41]

$\lambda_{22} = \lambda l + \lambda a - \lambda as \cos(2\theta + \frac{2}{3}\pi)$ [Mathematical Formula 42]

$\lambda_{23} = -\frac{1}{2}\lambda a - \lambda as \cos 2\theta$ [Mathematical Formula 43]

$\lambda_{33} = \lambda l + \lambda a - \lambda as \cos(2\theta - \frac{2}{3}\pi)$ [Mathematical Formula 44]

$\lambda_{21} = \lambda_{12}$ [Mathematical Formula 45]

$\lambda_{31} = \lambda_{13}$ [Mathematical Formula 46]

$\lambda_{32} = \lambda_{23}$. [Mathematical Formula 47]

5. A non-transitory computer readable medium having stored thereon a motor-model computing program that when executed by a computer causes the computer to perform a motor-model method for computing a motor model, the motor model being defined by an equation on a stationary coordinate system, the stationary coordinate system specifying a state of an alternate-current motor which comprises a rotor for generating a magnetic-field flux ψr and a stator with multiple-phase armature coils wound therearound, said equation including at least a multiple-phase armature current i and a multiple-phase armature voltage U as variables thereof, the motor-model method comprising the steps of:

computing a current magnetic flux ψs, which is an armature-coil flux linkage resulting from the multiple-phase armature current i, by means of feeding a predetermined function, whose variable is a rotary angle θ, and a value of the multiple-phase armature voltage U into a first equation, which specifies a quantitative relationship between the current magnetic flux ψs, said predetermined function and the multiple-phase armature voltage U; and computing the multiple-phase armature current i by means of feeding the current magnetic flux ψs and a value of said predetermined function into a second equation, which specifies a quantitative relationship between the current magnetic flux ψs, said predetermined function and the multiple-phase armature current i, wherein said step of computing the current magnetic flux ψs comprises the steps of:

computing a matrix $\lambda(\theta)$, which is a function being equal to the inverse matrix of an inductance matrix $L(\theta)$ specifying a relationship between the current magnetic flux ψs and the multiple-phase armature current i, and obtaining a resultant value for said equation by feeding the value of said matrix $\lambda(\theta)$ into the equation as the value of the inverse matrix of the inductance matrix $L(\theta)$, which is included in said equation, wherein said step of computing the matrix $\lambda(\theta)$ comprises the steps of:

computing inductance reciprocal functions λas and λa by feeding the reciprocal λl of d-axis inductance Ld of said alternate-current motor, the reciprocal λq of q-axis inductance Lq thereof and the reciprocal λl of leakage inductance Ll thereof into a Mathematical Formula 37 and a Mathematical Formula 38, and $$\lambda as = \frac{1}{3}(\lambda q - \lambda d)$$ [Mathematical Formula 37]

-continued $$\lambda a = \frac{1}{3}(\lambda q + \lambda d) - \frac{2}{3}\lambda l$$ [Mathematical Formula 38]

computing λ11, λ12, λ13, λ21, λ22, λ23, λ31, λ32 and λ33, the respective elements of the matrix $\lambda(\theta)$, by feeding the computed inductance reciprocal functions λas and λa and the reciprocal λl of the leakage inductance Ll into a Mathematical Formula 39 through a Mathematical Formula 44

$\lambda_{11} = \lambda l + \lambda a - \lambda as \cos 2$ [Mathematical Formula 39]

$\lambda_{12} = -\frac{1}{2}\lambda a - \lambda as \cos(2\theta - \frac{2}{3}\pi)$ [Mathematical Formula 40]

$\lambda_{13} = -\frac{1}{2}\lambda a - \lambda as \cos(2\theta + \frac{2}{3}\pi)$ [Mathematical Formula 41]

$\lambda_{22} = \lambda l + \lambda a - \lambda as \cos(2\theta + \frac{2}{3}\pi)$ [Mathematical Formula 42]

$\lambda_{23} = -\frac{1}{2}\lambda a - \lambda as \cos 2\theta$ [Mathematical Formula 43]

$\lambda_{33} = \lambda l + \lambda a - \lambda as \cos(2\theta - \frac{2}{3}\pi)$ [Mathematical Formula 44]

$\lambda_{21} = \lambda_{12}$ [Mathematical Formula 45]

$\lambda_{31} = \lambda_{13}$ [Mathematical Formula 46]

$\lambda_{32} = \lambda_{23}$. [Mathematical Formula 47]

6. A computer implemented simulation method of periodically executing a computing step of computing a state of an object model for imitating an operation of a predetermined object, the objective model being defined by an equation which includes the inverse matrix of a predetermined matrix $L(\theta)$ being a function changing periodically, thereby simulating the state of said objective model in real time, the state being defined by said objective model, the simulation method comprising the step of:

defining, using the computer, a matrix $\lambda(\theta)$, which is a function being equal to said inverse matrix, and computing the respective elements of said matrix $\lambda(\theta)$, thereby performing the computation of the inverse matrix of said matrix $L(\theta)$, wherein said objective model is a motor model which is defined by an equation on a stationary coordinate system, the stationary coordinate system specifying a state of an alternate-current motor which comprises a rotor for generating a magnetic-field flux ψr and a stator with multiple-phase armature coils wound therearound, said equation including at least a multiple-phase armature current i and a multiple-phase armature voltage U as variables thereof and said matrix $L(\theta)$ is a matrix of inductances of multiple-phase armature coils, inductances whose variable is a rotary angle θ and which specify a relationship between a current magnetic flux ψs, which is an armature-coil flux linkage resulting from the multiple-phase armature current i, and the multiple-phase current i, wherein said matrix $\lambda(\theta)$ is computed based on a d-axis inductance Ld of said alternate-current motor, a q-axis inductance Lq of the alternate-current motor and a leakage inductance Ll thereof.

7. The computer implemented simulation method according to claim 6, wherein inductance reciprocal functions λas and λa are computed by feeding the reciprocal λd of the d-axis inductance Ld, the reciprocal λq of the q-axis inductance Lq and the reciprocal $\lambda l$ of the leakage inductance Ll into a Mathematical Formula 37 and a Mathematical Formula 38, and $$\lambda as = \frac{1}{3}(\lambda q - \lambda d) \qquad \text{[Mathematical Formula 37]}$$

$$\lambda a = \frac{1}{3}(\lambda q + \lambda d) - \frac{2}{3}\lambda \ell \qquad \text{[Mathematical Formula 38]}$$

$\lambda 11$, $\lambda 12$, $\lambda 13$, $\lambda 21$, $\lambda 22$, $\lambda 23$, $\lambda 31$, $\lambda 32$ and $\lambda 33$, the respective elements of the matrix $\lambda(\theta)$, are computed by feeding the computed inductance reciprocal functions $\lambda as$ and $\lambda a$ and the reciprocal $\lambda l$ of the leakage inductance Ll into a Mathematical Formula 39 through a Mathematical Formula 44

$$\lambda_{11} = \lambda l + \lambda a - \lambda as \cos 2\theta \qquad \text{[Mathematical Formula 39]}$$

$$\lambda_{12} = -\tfrac{1}{2}\lambda a - \lambda as \cos(2\theta - \tfrac{2}{3}\pi) \qquad \text{[Mathematical Formula 40]}$$

$$\lambda_{13} = -\tfrac{1}{2}\lambda a - \lambda as \cos(2\theta + \tfrac{2}{3}\pi) \qquad \text{[Mathematical Formula 41]}$$

$$\lambda_{22} = \lambda l + \lambda a - \lambda as \cos(2\theta + \tfrac{2}{3}\pi) \qquad \text{[Mathematical Formula 42]}$$

$$\lambda_{23} = -\tfrac{1}{2}\lambda a - \lambda as \cos 2\theta \qquad \text{[Mathematical Formula 43]}$$

$$\lambda_{33} = \lambda l + \lambda a - \lambda as \cos(2\theta - \tfrac{2}{3}\pi) \qquad \text{[Mathematical Formula 44]}$$

$$\lambda_{21} = \lambda_{12} \qquad \text{[Mathematical Formula 45]}$$

$$\lambda_{31} = \lambda_{13} \qquad \text{[Mathematical Formula 46]}$$

$$\lambda_{32} = \lambda_{23}. \qquad \text{[Mathematical Formula 47]}$$

* * * * *

UNITED STATES PATENT AND TRADEMARK OFFICE
CERTIFICATE OF CORRECTION

| | | |
|---|---|---|
| PATENT NO. | : 7,813,904 B2 | Page 1 of 1 |
| APPLICATION NO. | : 11/719605 | |
| DATED | : October 12, 2010 | |
| INVENTOR(S) | : Zibo Kang et al. | |

It is certified that error appears in the above-identified patent and that said Letters Patent is hereby corrected as shown below:

IN THE SPECIFICATION

Column 4, line 23, please delete "$\lambda_{11}=\lambda\ell+\lambda a-\lambda as\ \cos\ 2$" and insert --$\lambda_{11}=\lambda\ell+\lambda\ a-\lambda as\ \cos\ 2\theta$--.

IN THE CLAIMS

Claim 2, Column 23, line 27, delete "$\lambda_{11}=\lambda\ell+\lambda a-\lambda as\ \cos\ 2$" and insert --$\lambda_{11}=\lambda\ell+\lambda a-\lambda as\ \cos\ 2\theta$--;

Claim 4, Column 25, line 1, delete "$\lambda_{11}=\lambda\ell+\lambda a-\lambda as\ \cos\ 2$" and insert --$\lambda_{11}=\lambda\ell+\lambda a-\lambda as\ \cos\ 2\theta$--;

Claim 5, Column 25, line 58, delete "$\lambda l$" and insert --$\lambda d$--;

Claim 5, Column 26, line 14, delete "$\lambda_{11}=\lambda\ell+\lambda a-\lambda as\ \cos\ 2$" and insert --$\lambda_{11}=\lambda\ell+\lambda a-\lambda as\ \cos\ 2\theta$--;

Claim 7, Column 28, line 1, delete "$\lambda_{11}=\lambda\ell+\lambda a-\lambda as\ \cos\ 2$" and insert --$\lambda_{11}=\lambda\ell+\lambda a-\lambda as\ \cos\ 2\theta$--.

Signed and Sealed this
Tenth Day of May, 2011

David J. Kappos
*Director of the United States Patent and Trademark Office*